UNITED STATES PATENT OFFICE.

EDWARD J. WALL, OF CAMBRIDGE, AND JOSEPH W. PHELAN, OF MEDFORD, MASSACHUSETTS, ASSIGNORS TO KALMUS, COMSTOCK & WESTCOTT, INC., OF BOSTON, MASSACHUSETTS, A CORPORATION OF MASSACHUSETTS.

MARGARIN AND METHOD OF MAKING THE SAME.

1,386,475.     Specification of Letters Patent.     Patented Aug. 2, 1921.

No Drawing.     Application filed July 15, 1919. Serial No. 311,041.

*To all whom it may concern:*

Be it known that we, EDWARD J. WALL and JOSEPH W. PHELAN, residing at Cambridge and Medford, respectively, in the county of Middlesex, Commonwealth of Massachusetts, have invented a certain Improvement in Margarin and Methods of Making the Same; and we do hereby declare the following to be a full, clear, and exact description of the invention, such as will enable others skilled in the art to which it appertains to make and use the same.

The present invention relates to an improved margarin and method of making the same. Cacao oil, which is a by-product of the manufacture of chocolate from the cacao bean has heretofore found a limited market for use in the manufacture of cosmetics and certain pharmaceutical supplies, but it has not heretofore been used as a food product to any substantial extent, except in candy making. One object of the present invention is to produce an improved method of making margarin employing cacao oil as a constituent. Another object of the invention is to produce a new and inexpensive margarin.

Ordinary cacao oil, the by-product of the manufacture of chocolate from the cacao bean, is not suitable for use in the manufacture of margarin without refining for the purpose of removing the solid chocolate in suspension therein and certain volatile substances which characterize the taste and smell of the oil. The chocolate in suspension may be removed by any usual method of filtering which will be carried on at a temperature sufficiently high to insure fluidity of the oil. It is further refined to remove the volatile, odorous and gustable ingredients by the diffusion process, which forms the subject-matter of our co-pending application executed of even date herewith. According to such method, the oil is exposed in thin layers in a liquid state at a temperature near its melting point to a current of air for a period of from twenty to thirty days, by which means the volatile, odorous and gustable ingredients are removed. The refined cacao oil has no characteristic odor or taste aside from the faint and tenuous odor and taste incident to its bland, oleaginous quality and it is adapted for use as a comestible, and particularly as an ingredient of margarin. The margarin produced by the present method consists of an emulsion of cacao oil and butter fat.

The specific process is described as follows: The milk or cream to be used is analyzed in order to ascertain the total butter fat content. It is then placed in a churn and churned, at a temperature preferably of 35° C., until the point of incipient butter formation is reached. This is evidenced by the thickening of the milk or cream and by the deepening of its color. The churning operation is then suspended and an amount of cacao oil is weighed out which equals a quantity of butter fat content of the churn. This is poured into the churn and the churning is then continued for some time, varying from one to two hours, according to the temperature, a longer time being required at higher temperatures. At the end of that time the churn will contain a mass of margarin mixed with buttermilk. The buttermilk is then drawn off. The product is washed with a number of waters to remove the buttermilk. The successive waters are of decreasing temperatures. The first water has a temperature of 25° C., the second, 20° C., then 15° C., 12° C., 10° C., 8° C., and subsequent waters having this temperature. Ordinarily ten washings are required in order to remove the buttermilk; the large number being required by reason of the tenacity with which the margarin retains the buttermilk. It is necessary to substantially completely remove the buttermilk as its presence in the margarin conduces to early rancidity and decomposition. The washing may be done in the churn or by the butter worker. With the successive waters the butter-like masses accumulate in larger and larger masses until at the end the margin is present in large heavy bodies.

It is important to observe that the margarin product apparently consists of a complete emulsion of the cacao oil and butter fat, and it is believed that the cacao oil constitutes the disperse phase of the product, and the butter fat constitutes the continuous phase of the product. Thus the product is to be distinguished from a mixture consisting of butter fat and cacao oil, as such a mixture, even where the butter is melted when it is mixed with the oil, is an emulsion wherein the butter fat constitutes the disperse phase and the oil the continuous phase, in which case a lumpy, non-homogeneous, unsatisfactory product is secured. In its broader aspects, however, the invention contemplates any emulsion of cacao oil and butter fat. An important feature of the process consists in the churning of the milk or cream to the point of incipient butter formation before the oil is introduced, which results in the most pleasing and satisfactory product, because, it is believed, the product is an emulsion of the oil in the butter fat. It is to be observed that when the product cools, the continuous-phase butter fat determines the mechanical consistency and characteristics of the product, and it may be conceived that each minute particle of oil is surrounded by a skin of butter fat, so that no matter what the shape of the oil particles may be, they are each discrete or separate, while the skin of butter fat forms a continuous vehicle without discrete particles. In case it be desired to lower the melting point of the margarin, peanut oil, or other edible oil liquid at room temperatures, may be added to the cacao oil before the latter is put in the churn. This diluent, as it may be called, probably contributes to the continuous phase.

The product is characterized by the odor, flavor and a consistency somewhat harder than that of creamery butter. It will suffer to be melted in high room temperatures, or when used for frying and will again solidify without loss of its homogeneous character. This seems to substantiate the completeness of the emulsification. Inasmuch as the cacao oil is wholly devoid of taste and smell aside from a faint or tenuous oleaginous taste or smell, the product is clearly and distinctly characterized by odor and taste of the butter fat, and it is apparently gustably indistinguishable from creamery butter. Assuming cacao butter to have a present market value lower than that of creamery butter, it is apparent that the product can be offered to the purchasing public as a pleasing margarin at a price not substantially lower than that of creamery butter, and at a profit to the manufacturer. One feature which will commend the product to the purchaser will be the fact that it has the color of butter and has this color without any addition of coloring matter, thus dispensing with the usual capsules of coloring matter supplied with margarin and the domestic working of the color into the margarin in order to prepare it for the approval of the eye at the table.

Having thus described the invention, what is claimed is:

1. The method of making margarin which consists in churning milk or cream and cacao oil together until the butter of the milk or cream has completely come.

2. The method of making margarin which consists in churning milk or cream to the point of incipient butter formation, adding melted cacao oil and continuing the churning until the butter has completely come.

3. The method of making margarin which consists in churning milk or cream to the point of incipient butter formation, adding melted cacao oil in amount equal to the butter fat content of the milk, and continuing the churning until the butter has completely come.

4. The method of making margarin which consists in churning milk or cream to the point of incipient butter formation, adding melted cacao oil, continuing the churning until the butter has completely come, and washing the margarin.

5. The method of making margarin which consists in emulsifying cacao oil and butter fat to produce an emulsion wherein the former is the disperse phase and the latter the continuous phase.

6. A margarin which consists in an emulsion of cacao oil and butter fat.

7. A margarin which consists in an emulsion of cacao oil and butter fat wherein the former is the disperse phase and the latter the continuous phase.

8. A margarin which consists in an emulsion of equal quantities of cacao oil constituting the disperse phase and butter fat constituting the continuous phase.

9. A margarin which consists of an emulsion of cacao oil and butter fat with the addition of an edible oil, liquid at room temperatures, for securing a lowered melting point.

EDWARD J. WALL.
JOSEPH W. PHELAN.